United States Patent [19]

Braithwaite

[11] Patent Number: 4,775,403
[45] Date of Patent: Oct. 4, 1988

[54] PARSION TRANSFERRING AND ARTICLE REMOVING IN GLASSWARE FORMING MACHINES

[75] Inventor: David Braithwaite, Doncaster, England

[73] Assignee: Emhart Industries, Inc., Farmington, Conn.

[21] Appl. No.: 133,716

[22] Filed: Dec. 16, 1987

[30] Foreign Application Priority Data

Jan. 6, 1987 [GB] United Kingdom ................ 8700156

[51] Int. Cl.⁴ .............................................. C03B 9/40
[52] U.S. Cl. ...................................... 65/241; 65/260;
65/314; 65/319; 65/219
[58] Field of Search ................. 65/215, 219, 241, 260,
65/305, 308, 314, 319

[56] References Cited

U.S. PATENT DOCUMENTS

| | | | |
|---|---|---|---|
| 1,911,119 | 5/1933 | Ingle | 65/260 X |
| 3,169,846 | 2/1965 | Zappia | 65/241 X |
| 3,644,111 | 2/1972 | Becker | 65/241 X |
| 4,244,725 | 1/1981 | Fenton | 65/260 |
| 4,276,075 | 6/1981 | Olivotto | 65/241 X |
| 4,525,195 | 6/1985 | Foster | 65/260 |

Primary Examiner—Robert L. Lindsay
Attorney, Agent, or Firm—Spencer T. Smith

[57] ABSTRACT

A glassware forming machine of the individual section type comprising a parison-forming station (10), an article-forming station (14), parison transferring means operable to transfer parisons to the article-forming station, and article removing means operable to remove articles from the article-forming station. The parison transferring means comprises a carriage (100), parison gripping means (114) mounted on the carriage, and servo-controlled drive means (136) operable to move the carriage (100) to and from the article-forming station (14). The article removing means comprises a further carriage (210), article gripping means (226) mounted on the carriage (210), and drive means (218, 220) operable to return the carriage (210) to the article-forming station (14). The carriages (100 and 210) are so aligned that, as the carriage (100) moves to the article-forming station (14), it pushes the further carriage (210) away therefrom. Thus, both carriages (100 and 210), when carrying hot glass, are moved with servo-control.

6 Claims, 5 Drawing Sheets

PARSION TRANSFERRING AND ARTICLE REMOVING IN GLASSWARE FORMING MACHINES

BACKGROUND OF THE INVENTION

This invention is concerned with parison transferring and article removing in glassware forming machines, in particular glassware forming machines of the individual section type.

Glassware forming machines of the individual section type generally comprise two operating stations which are a parison-forming station and an article-forming station at which parisons formed at the parison-forming station are formed into articles of glassware. Parison-transferring means, often called an invert mechanism as it inverts the parison, transfers the parisons from the parison-forming station to the article-forming station and article removing means, often called a take-out mechanism, removes completed articles from the article-forming station and deposits them on a dead plate. Such a machine is described, for example, in U.S. Pat. No. 1,911,119.

In G.B. Patent Specification No. 1,491,859, a machine of the individual section type is described in which parisons are transferred linearly to an intermediate station before being transferred, again linearly, to the article-forming station. The parisons are supported at the intermediate station for re-heating of the chilled surface thereof by heat retained in the remainder of the parison. This enables a faster operation of the machine as the parisons do not have to pause at the article-forming station to allow such re-heating. This invention is applicable to machines in which the parisons are transferred linearly to the article-forming station whether directly from the parison-forming station or from an intermediate station.

It has been recognised (see European Patent Specification No. 0,059,568) that it is desirable to move parisons linearly by an electrical or hydraulic servomechanism operated by an electrical command signal so that the parisons are moved according to a position against time curve designed to minimise distortion of parison by acceleration and de-acceleration forces. It is an object of this invention to provide a machine in which distortion of both parisons and newly-formed articles is minimised and which is capable of high production speeds.

BRIEF SUMMARY OF THE INVENTION

The invention provides a glassware forming machine of the individual section type comprising a parison-forming station at which gobs of molten glass are formed into parisons, and an article-forming station at which parisons are formed into articles of glassware, the machine also comprising parison transferring means operable to transfer parisons to the article-forming station, the parison transferring means comprising gripping means, a carriage on which the parison gripping means is mounted, the carriage being mounted for movement between a parison gripping position at which the parison gripping means can grip a parison and a parison releasing position at the article-forming station at which the parison gripping means can release the parison for forming into an article, and servo-controlled drive means operable to move the carriage between the parison gripping and releasing positions according to a predetermined position against time curve, the machine also comprising article removing means operable to remove articles from the article-forming station, the article removing means comprising article gripping means, a further carriage on which the article gripping means is mounted, the further carriage being mounted for movement between an article gripping position at the article-forming station at which the article gripping means can grip an article and an article releasing position, and drive means operable to drive the further carriage from the article-releasing position to the article-gripping position, the carriage of the parison transferring means and the further carriage of the article removing means being so aligned with one another that, as the carriage moves from the parison-gripping position to the parison-releasing position, it pushes the further carriage from the article-gripping position to the article-releasing position.

In a machine according to the last preceding paragraph, the motions of the parisons and newly-formed articles can be controlled according to the same position against time curve arranged to minimise distortion. Both parisons and articles are moved by the same servo-controlled drive means so that the cost of the system is also minimised. As the article removing means is returned to the article gripping means by independent drive means and as servo-control is not necessary for this movement, the article removing means can be returned rapidly increasing the speed of production.

There now follows a detailed description to be read with reference to the accompanying drawings of a glassware forming machine which is illustrative of the invention. It is to be understood that the illustrative machine has been selected for description by way of example and not of limitation of the invention.

DETAILED DESCRIPTION

The illustrative glassware forming machine is of the individual section type and comprises a parison-forming station 10 at which gobs of molten glass are formed into parisons, an intermediate station 12, and an article-forming station 14 at which parisons are formed into articles of glassware. The intermediate station 12 is between the stations 10 and 14 and enables parisons formed at the station 10 to be treated before delivery to the station 14 or parisons to be rejected by being dropped into a cullet chute 16 (see FIG. 3).

The illustrative machine comprises a supporting frame 20 which comprises a base plate 22, side plates 24 and four vertically-extending transverse plates 25, 26, 27 and 28, the plates 25 and 26 being at opposite edges of the station 10 and the plates 27 and 28 being at opposite edges of the station 14.

Figure 2:
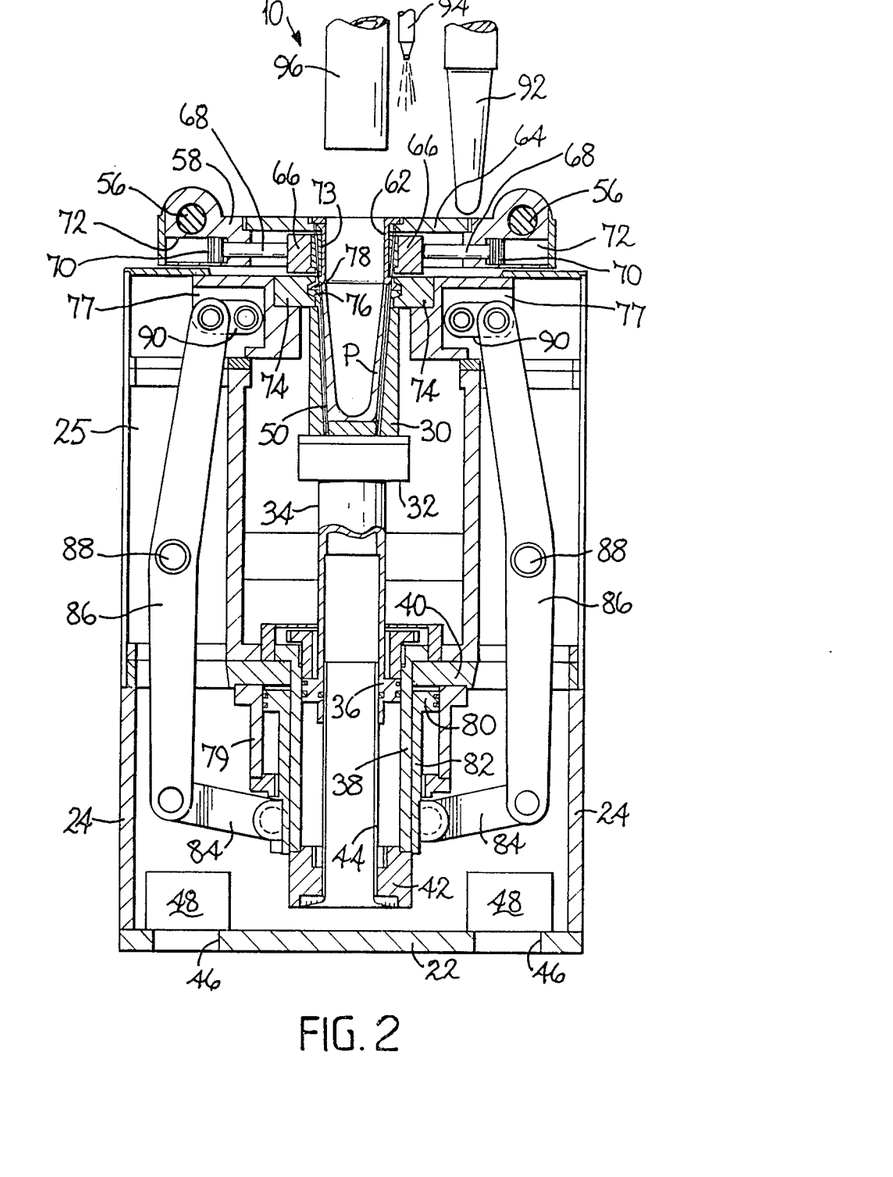
FIG. 2 is a cross-sectional view taken on the line II—II in FIG. 1.

The parison-forming station 10 is shown in FIG. 2. At the station 10 two parisons are formed simultaneously one in each of two one-piece blank moulds 30. The moulds 30 are supported on a box 32 mounted on top of a tubular piston rod 34. The tubular piston rod 34 extends upwardly from a piston 36 movable vertically within a cylinder 38. The cylinder 38 is supported by a cross member 40 extending transversely between two side plates 24 of the machine frame. Introduction of air under pressure into the cylinder 38 enables the moulds 30 to be raised or lowered. A bottom end cap 42 of the cylinder 38 supports a tube 44 which extends upwardly through the end cap 42 into the cylinder 38 and is telescopically received in a passage through the piston 36, seals being provided between the tube 44 and the piston 36 and between the tube 44 and the end cap 42. The tube 44 allows air introduced into the interior of the machine frame 20 through orifices 46 in the bottom plate 22 to pass through the tube 44 into the tubular piston rod 34 and from thence into the box 32. Valves 48 are provided to control passage of mould cooling air through the orifices 46 from ducting (not shown) in a machine base (not shown) on which the base plate 22 is mounted. The passage of cooling air is controlled in an on/off manner. The air passes upwardly through the tube 44, the tubular piston rod 34 and the box 32, and through holes (not shown) in a top plate of the box 32 into cooling passages 50 in the moulds 30.

Figure 1:
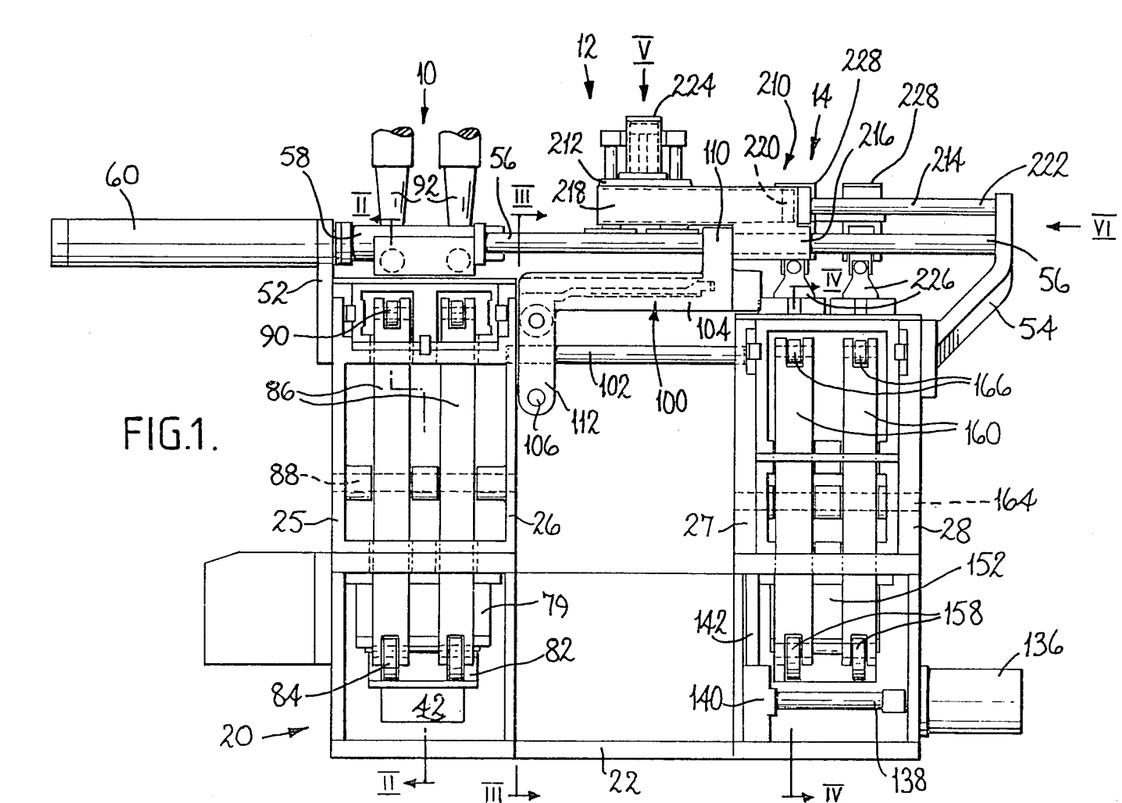
FIG. 1 is a side elevational view of the illustrative machine.

The transverse plates 25 and 28 support upwardly-extending brackets 52 and 54 respectively (see FIG. 1). These brackets 52 and 54 support two longitudinally-extending guide rods 56 which extend parallel to one another. A carriage 58 is mounted for sliding movement along the guide rods 56 between the parison-forming station 10 and the intermediate station 12. The carriage 58 provides parison transferring means operable to transfer parisons from the station 10 to the station 12. The carriage 58 is arranged to be moved between the stations 10 and 12 by the action of a pneumatic piston and cylinder assembly 60 mounted on the bracket 52 and having a piston rod secured to the carriage 58.

The carriage 58 supports two funnels 62 (see FIG. 2) which are arranged to guide gobs of molten glass into the moulds 30, the funnels 62 being supported by a removable transversely-extending plate 64 of the carriage 58. The carriage 58 also supports two neck ring halves 66 which are arranged to cooperate with the moulds 30 in shaping the neck regions of parisons P and to support parisons during movement of the carriage 58 from the parison-forming station 10 to the intermediate station 12. The neck ring halves 66 are mounted on piston rods 68 of pistons 70 movable in horizontally-extending cylinders 72 formed in the carriage 58. The piston and cylinder assemblies 70, 72 are operable pneumatically to move the neck ring halves 66 towards or away from one another. The neck ring halves 66 have cooling passages 73 therein arranged to receive air from the cooling passages 50 in the moulds 30.

The parison forming station 10 has two mould and neck ring clamping members 74 arranged to clamp an upper flange 76 of each mould 30 to a lower flange 78 of the associated neck ring halves 66. The clamping member 74 have complementary grooves to the flanges 76 and 78 and are arranged on opposite sides of the moulds 30 and are mounted on supports 77 which are mounted on the frame 20 for horizontal sliding movement towards or away from one another. The supports 77 are moved by operation of a pneumatic piston and cylinder assembly comprising a vertically-extending cylinder 79, which is supported by the cross member 40 and encircles the piston and cylinder assembly 36, 38, and a piston 80 which has a downwardly-extending tubular piston rod 82 whose interior cylindrical surface slides on the outside of the cylinder 38. A lower end portion of the piston rod 82 is pivotally connected to four links 84. Each link 84 is pivotally connected to a lower end portion of one of four levers 86 which extend upwardly two on each side of the moulds 30. The levers 86 are pivotally mounted at central portions thereof on two shafts 88 supported by the plates 25 and 26, two levers 86 being pivoted on each shaft 88. Upper end portions of the levers 86 are pivotally connected to links 90 which are also pivotally connected to the supports 77. When the piston and cylinder assembly 79, 80 is operated to move the piston 80 downwardly, the links 84 pull the lower end portions of the levers 86 towards the cylinder 79 and the clamping members 74 are pulled apart. Operation of the assembly 79, 80 in the opposite direction results in the clamping members 74 being forced together.

At the parison-forming station 10 but mounted above the frame 20 on support beams (not shown) are two plungers 92, two lubricant spray heads 94 and two gob guides 96. The plungers 92, spray heads 94 and guides 96 can be moved en bloc transversely of the machine so that they can all be aligned with the moulds 30 by a pneumatic piston and cylinder assembly (not shown) and the plungers 92 can be lowered into the moulds 30 and withdrawn therefrom by pneumatic piston and cylinder assemblies (not shown).

The operation of the parison forming station 10 will now be described. When gobs of molten glass are to be received into the moulds 30, the guides 96 are aligned with the moulds 30 which are in their upper position with the piston 36 at the top of the cylinder 38, the neck ring halves 66 are engaging one another, and the clamping members 74 are clamping the neck ring halves 66 to the moulds 30. In this condition, gobs are dropped down the guides 96, pass through the funnels 62 and enter the moulds 30. The guides 96, the spray heads 94, and the plungers 92 are moved transversely of the machine until the plungers 92 are aligned with the moulds 30. Next, the plungers 92 are lowered into the moulds 30 so that the gobs are pressed against the moulds 30 and neck ring halves 66 into parisons P. The plungers 92 are then raised out of the moulds 30, the piston and cylinder assembly 79, 80 is operated to withdraw the clamping members 74 from the moulds 30, the piston and cylinder assembly 36, 38 is operated to lower the moulds 30 clear of the parisons P, and the parisons are left supported by the neck ring halves 66. The piston and cylinder assembly 60 is now operated to move the carriage 58 to the station 12 taking the parisons P with it. On return of the carriage 58 from the station 12, the assemblies 36, 38 and 79, 80 are operated to return the station 10 to condition to receive further gobs. During the formation of parisons, the moulds 30 are cooled by passage of air through the passages 50 as described above. When it is desired, to lubricate the moulds 30, the station 10 is operated but gobs are not dropped into the moulds 30 and as the spraying heads 94 pass over the moulds 30 they spray lubricant thereinto.

Figure 3:
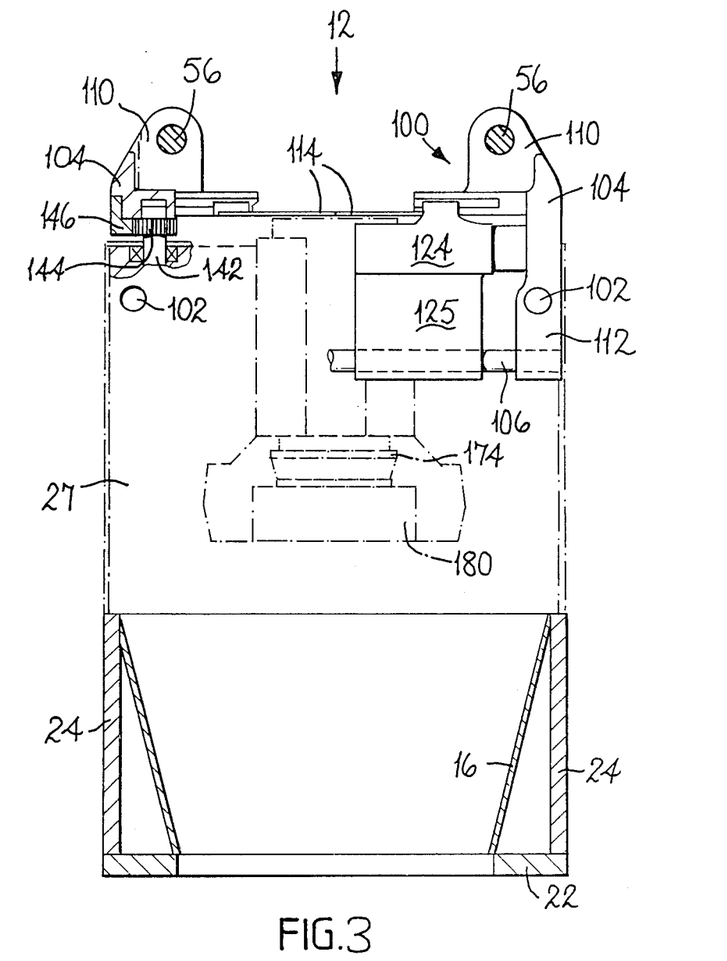
FIG. 3 is a cross-sectional view taken on the line III—III in FIG. 1.

The intermediate station 12 is shown in FIG. 3 at a time when the carriage 58 is at the station 10. However, when the carriage 58 is at the station 12, the piston and cylinder assemblies 70, 72 are operated to release the parisons P from the neck ring halves 66. As the carriage 58 returns to the station 10, the assemblies 70, 72 are operated again to return the neck ring halves 66 to engagement with one another.

At the intermediate station 12, the parisons P can be rejected by being dropped into the cullet chute 16 or treated by mechanisms located at the station 12 (such mechanisms are not shown in the drawings).

The illustrative glassware forming machine comprises parison transferring means operable to transfer parisons P from the intermediate station 12 to the article-forming station 14. This parison forming means comprises a carriage 100 and parison gripping means, the parison gripping means being mounted on the carriage 100. The carriage 100 is mounted for sliding movement on the guide rods 56 and also on two guide rods 102 supported by the transverse plates 26 and 27. The carriage 100 can slide along the rods 56 and 102 between a parison gripping position thereof at the intermediate station 12 at which the parison gripping means can grip parisons P, and a parison releasing position at the article-forming station 14 at which the parison gripping means can release the parisons for forming into articles.

Figure 5:
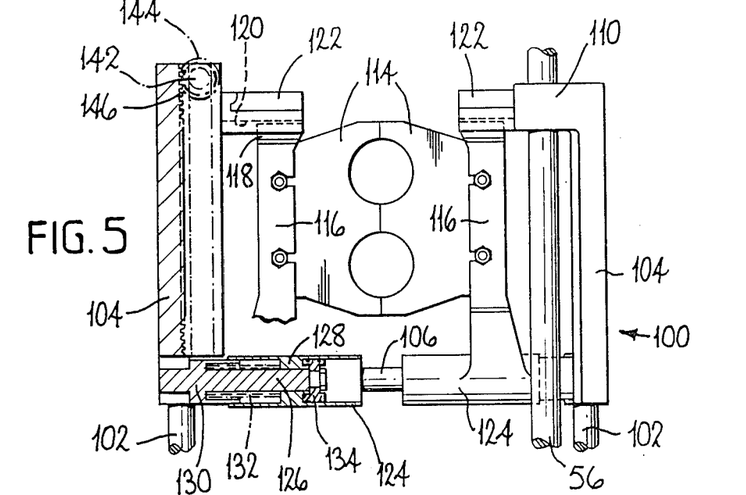
FIG. 5 is a view taken in the direction of the row V in FIG. 1 of an intermediate station of the illustrative machine.
Figure 6:
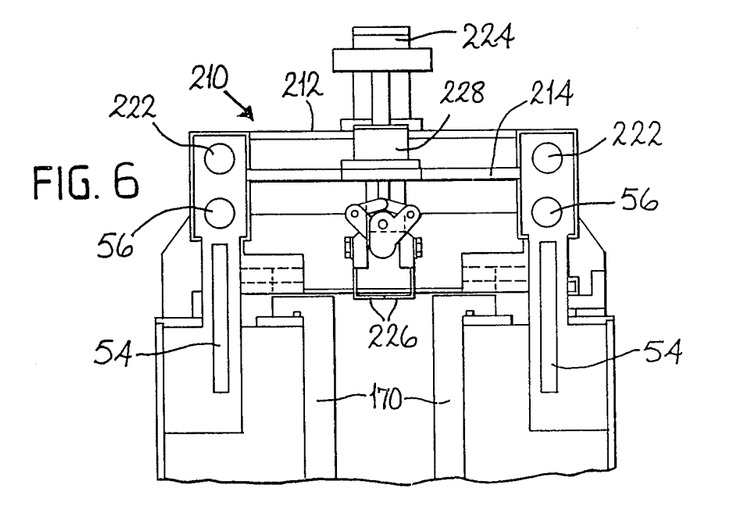
FIG. 6 is a view taken in the direction of the arrow VI in FIG. 1.

The carriage 100 (FIGS. 1, 3 and 5) comprises two side members 104 and a transversely extending rod 106 interconnecting the side members 104. Each side member 104 is slidable on one of the rods 56 and one of the rods 102. Each side member 104 has an upwardly-extending portion 110 at a front end portion thereof (the end nearest the station 14 when the carriage 100 is at the station 12) which is slidable on one of the rods 56, and a depending portion 112 at a rear end portion thereof which is slidable on one of the rods 102. The rod 106 is secured to the portions 112 of the side members 104.

The parison gripping means of the parison transferring means operable to transfer parisons from the intermediate station 12 to the article-forming station 14 comprises two neck ring halves 114 each of which is mounted on one of two supports 116 which are mounted on the carriage 100 for movement towards one another, to bring the neck ring halves 114 into gripping engagement, or away from one another, to separate the halves 114. Each support 116 has a front end portion 118 (FIG. 5) which is slidably-received in a slideway 120 formed on a transverse projection 122 from one of the side members 104. The rear end portion of each support 116 is formed into a cylinder 124 which is slidably mounted on a stub shaft 126 which projects transversely from one of the side members 104. Each cylinder 124 also has a downward projection 125 which is slidable on the rod 106. There are, thus, two stub shafts 126 aligned with one another but with a gap between them. Each cylinder 124 has an internal flange 128 which is slidable on the shaft 126 and the shaft 126 has an external flange 130. A spring 132 acts between the flanges 128 and 130 to urge the neck ring half 114 on the support 116 into gripping engagement with the other neck ring half 114. A piston 134 is mounted on the shaft 126 on the opposite side of the flange 128 from the spring 132 so that, by introduction of air under pressure into the cylinder 124 between the piston 134 and the flange 128, the support 116 can be moved against the action of the spring 132.

The parison transferring means for transferring parisons to the article-forming station 14 also comprises servo-controlled drive means operable to move the carriage 100 between the parison gripping position at the intermediate station 12 and the parison releasing position at the article-forming station 14 according to a predetermined position against time curve. Suitable position against time curves and suitable control systems are described in the specification of European Patent No. 0,059,568. The drive means comprises an electric motor 136 (FIG. 1) which, in the illustrative machine, is a precision permanent magnet D.C. motor which, is servocontrolled by a control system as mentioned in the abovementioned specification. The motor 136 is mounted on the plate 28 and drives an output shaft 138 which drives a right angle gear box 140. The output shaft 142 of the gear box 140 extends upwardly and has a pinion 144 (FIGS. 3 and 5) mounted thereon. The pinion 144 meshes with a rack 146 mounted on one of the side members 104. Thus, operation of the motor 136 causes the pinion 144 to turn and the rack 146 and, thus, the carriage 100 to move.

When the carriage 100 is at the intermediate station 12, the piston and cylinder assemblies 124, 134 are operated to move the neck ring halves 114 apart. As the carriage 58 moves to the intermediate station 12 carrying parisons P, the parisons P pass between the cylinders 124 and above the rod 106 and arrive between the neck ring halves 114. The cylinders 124 are now depressurised so that the springs 132 move the neck ring halves 114 together so that they grip the parisons beneath the neck ring halves 66. The piston and cylinder assemblies 70, 72 are now operated so that the neck ring halves 66 release the parisons which are now supported by the neck ring halves 114. The carriage 58 now returns to the station 10. If the parisons are to be rejected, the piston and cylinder assemblies 124, 134 are operated so that the neck ring halves 114 release the parisons which fall into the cullet chute 16. If the parisons are not to be rejected, they remain at the station 12 supported by the neck ring halves 114 until any treatment of the parisons has been carried out and then the motor 136 is operated to move the carriage 100 with the parisons to the station 14.

Figure 4:
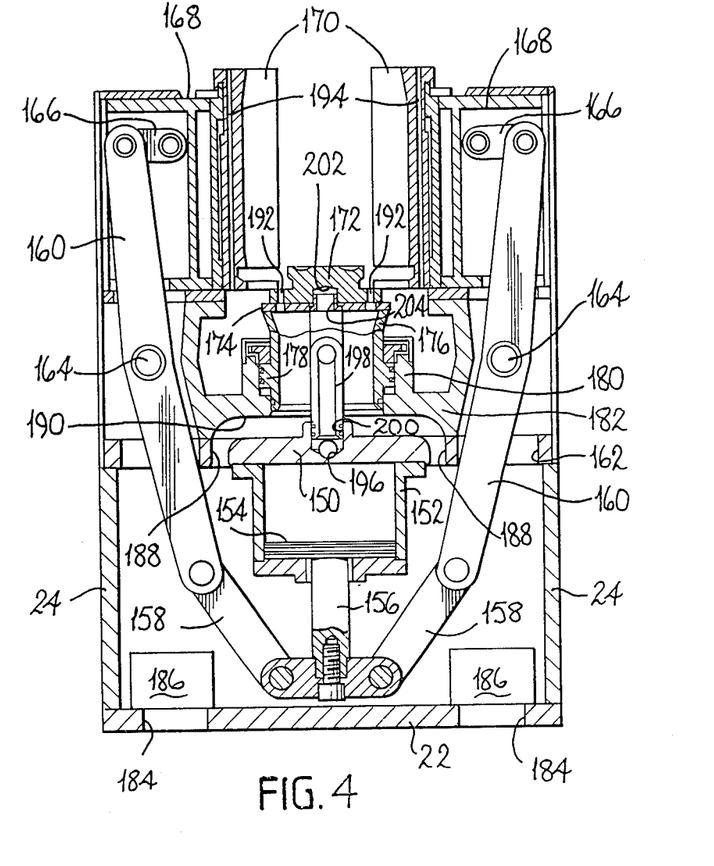
FIG. 4 is a cross-sectional view taken on the line IV—IV in FIG. 1.

At the article-forming station 14 (FIG. 4), a cross member 150 extends between the side plates 24. A vertically-extending cylinder 152 is supported on the underside of the member 150 and has a piston 154 movable therein. The piston 154 has a downwardly-extending piston rod 156 which is pivotally connected to four links 158. Each link 158 is pivotally connected to one of four levers 160 which extend upwardly two on each side of the cylinder 152. Each lever 160 passes through a hole 162 in the cross member 150 and is pivotally mounted on a longitudinally-extending rod 164 supported by the plates 27 and 28. There are two rods 164, one on each side of the machine, with two of the levers 160 mounted on each. The upper end portion of each lever 160 is pivotally connected to a link 166 which is pivotally connected to one of two mould side portion supports 168 which are mounted on the frame 20 for sliding movement towards or away from one another. Operation of the piston and cylinder assembly 152, 154 to move the piston 154 downwardly causes the lower end portions of the levers 160 to be pulled towards the cylinder 152 so that the supports 168 are moved apart (to the condition shown in FIG. 4). Operation of the assembly 152, 154 in the opposite direction causes the supports 168 to be moved towards one another.

The supports 168 are each arranged to support two finish mould side portions 170 in conventional manner. When the supports 168 are moved together, each side portion 170 cooperates with a side portion 170 supported by the other support 168 and with a bottom plate 172 in defining a mould cavity in which parisons can be moulded into articles. There are thus two bottom plates 172 which are supported on a plate 174 which is mounted at an upper end of a tubular piston rod 176 of a piston 178 movable vertically in a cylinder 180. The cylinder 180 is supported by a portion 182 of the frame 20 which is mounted on top of the cross member 150. The piston and cylinder assembly 178, 180 is operable to lower the bottom plates 172 to allow removal of articles from the mould cavities and to raise the plates 172 back to an operative position thereof (shown in FIG. 4).

In order to provide cooling air to the mould side portions 170, two orifices 184 are formed in the bottom plate 22 so that air can enter the machine frame at the station 14 from ducting in a machine base (not shown) on which the base plate 22 is mounted, on/off valves 186 being provided to control the duration of air entry. Air entering the frame passes through openings 188 in the cross member 150 and passages 190 formed between the cross member 150 and the frame portion 182. The air then enters the tubular piston rod 176, which extends right through the cylinder 180, and arrives at the underside of the plate 174. From here, the air passes upwardly through passages 192 in the plate 174 and the bottom plates 172 which, when the mould side portions 170 are engaging one another, communicate with vertically-extending cooling passages 194 in the mould side portions 170. The bottom plates 172 are also connected to a vacuum passage 196 in the cross member 150 by a pipe 198 which is telescopically-received in a recess 200 in the cross member 150 which communicates with the passage 196. The pipe 198 passes upwardly through the tubular piston rod 176 and branches to enter recesses 202 in each of the bottom plates 172, adaptors 204 of conventional construction being provided in holes in the plate 174 for connecting the recesses 202 to the pipe 198.

The illustrative machine also comprises article removing means operable to remove articles from the article-forming station 14. The article removing means (which has been omitted from FIG. 5 in the interests of clarity) comprises a carriage 210 which is mounted for movement between an article gripping position at the article-forming station 14 at which article gripping means of the article removing means mounted on the carriage 210 can grip an article and an article releasing position at which articles can be released on to a dead plate (not shown). The carriage 210 comprises two transversely-extending plates, a rearward plate 212 and a forward plate 214, interconnecting two side portions each of which comprises a depending portion 216 which is slidable on one of the guide rods 56 and a horizontally-extending pneumatic cylinder 218. Each cylinder 218 contains a fixedly-mounted piston 220 with a forwardly-extending piston rod 222 secured to one of the brackets 54.

The rearward plate 212 of the carriage 210 supports two blowheads (not shown) of conventional construction operable to blow air into parisons to cause them to expand, and a piston and cylinder assembly 224 operable to raise or lower the blowheads. The forward plate 214 of the carriage 210 supports the aforementioned article gripping means which comprises two pairs of tongs 226 of conventional construction and two piston and cylinder assemblies 228 for opening or closing the tongs 226.

The piston and cylinder assemblies 218, 220 provide drive means of the machine operable to drive the carriage 210 from the article-releasing position to the article-gripping position at the article-forming station 14. The carriage 100 of the parison transferring means and the carriage 210 of the article removing means are so aligned with one another that, as the carriage 100 moves from the parison gripping position at the intermediate station 12 to the parison-releasing position at the article-forming station 14, it pushes the carriage 210 from the article-gripping position to the article-releasing position. Specifically, the portions 110 of the carriage 100 engage the portions 216 of the carriage 210 and push them along the guide rods 56. When the carriage 100 returns to the intermediate station 12, the portions 110 separate from the portions 216 until the action of the piston and cylinder assembly 218, 220 moves the portions 210 back into engagement with the portions 110.

In the operation of the machine, in order to transfer parisons from the intermediate station 12 to the article forming station 14, the motor 136 is operated as aforementioned to drive the carriage 100. At this time the tongs 226 are gripping articles made in the previous cycle of operation of the machine. The carriage 100 moves from the station 12 to the station 14 carrying the parisons and the carriage 210 is pushed away from the station 14 carrying the articles. During this movement, which is servo-controlled according to a position against time curve designed to minimise distortion of the parisons and articles, the blowheads are lowered into the parisons by the operation of the piston and cylinder assembly 224. When the parisons arrive at the article-forming station 14, the piston and cylinder assembly 178, 180 is operated to raise the bottom plates 172 and the piston and cylinder assembly 152, 154 is operated to move the mould side portions 170 into engagement with one another and with the bottom plates 172 to define mould cavities surrounding the parisons. The blowheads are now used to blow air into the parisons to cause them to expand to the shape of the mould cavities. When the parisons have expanded, the piston and cylinder assemblies 124, 134 are operated to separate the neck ring halves 114. The carriage 100 is now returned to the intermediate station 12 by operation of the motor 136 in the opposite direction. The articles held by the tongs 226 are now released on to the dead plate by operation of the piston and cylinder assemblies 228 to open the tongs 226. The piston and cylinder assemblies 218, 220 are now operated to return the carriage 210 to the article-forming station 14. At the station 14, the piston and cylinder assemblies 228 are operated to close the tongs 226 so that the newly-formed articles are gripped. The piston and cylinder assemblies 152, 154 and 178, 180 are now operated to separate the side portions 170 and lower the bottom plates 72 to allow removal of the articles.

I claim:

1. A glassware forming machine of the individual section type comprising a parison-forming station at which gobs of molten glass are formed into parisons, and an article-forming station at which parisons are formed into articles of glassware, the machine also comprising parison transferring means operable to transfer parisons to the article forming station, the parison transferring means comprising parison gripping means, a carriage on which the parison gripping means is mounted, the carriage being mounted for movement between a parison gripping position at which the parison gripping means can grip a parison and a parison releasing position at the article forming station at which the parison gripping means can release the parison for forming into an article, and servo-controlled drive means operable to move the carriage between the parison gripping and releasing positions according to a predetermined position against time curve, the machine also comprising article removing means operable to remove articles from the article-forming station, the article removing means comprising article gripping means, a further carriage on which the article gripping means is mounted, the further carriage being mounted for movement between an article gripping position at the article-forming station at which the article gripping means can grip an article and an article releasing position, and drive means operable to drive the further carriage from the article-releasing position to the article gripping position, wherein the carriage of the parison transferring means and the further carriage of the article removing means are so aligned with one another that, as the carriage moves from the parison-gripping position to the parison-releasing position, it pushes the further carriage from the article-gripping position to the article-releasing position.

2. A machine according to claim 1, characterised in that the machine comprises an intermediate station between the parison-forming station and the article-forming station, the parison-gripping position of the carriage of the parison transferring means being at the intermediate station, and the machine also comprising further parison transferring means operable to transfer parisons from the parison-forming station to the intermediate station.

3. A machine according to claim 1, characterised in that the carriage of the parison transferring means and the further carriage of the article removing means are mounted for sliding movement on common guide rods.

4. A machine according to claim 1, wherein the servo-controlled drive means of the parison transferring means comprises an electric drive motor operable to drive a pinion meshed with a rack mounted on the carriage of the parison transferring means.

5. A machine according to claim 1, characterised in that the drive means of the article removing means comprises at least one piston and cylinder assembly comprising a fixedly-mounted piston and a cylinder mounted on the further carriage.

6. A machine according to claim 1, characterised in that the machine also comprises at least one blowhead operable to blow air into a parison to cause the parison to expand, the blowhead being mounted on the further carriage of the article removing means.

* * * * *